US012773965B2

(12) United States Patent
Furukawa et al.

(10) Patent No.: US 12,773,965 B2
(45) Date of Patent: Oct. 27, 2026

(54) OCCUPANT RESTRAINT DEVICE FOR VEHICLE

(71) Applicant: TOYOTA JIDOSHA KABUSHIKI KAISHA, Toyota (JP)

(72) Inventors: Daiki Furukawa, Toyota (JP); Katsuya Shimazu, Toyota (JP); Mitsuyoshi Ohno, Miyoshi (JP); Kaname Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/062,657

(22) Filed: Feb. 25, 2025

(65) Prior Publication Data

US 2025/0282318 A1 Sep. 11, 2025

(30) Foreign Application Priority Data

Mar. 6, 2024 (JP) ................................ 2024-034378

(51) Int. Cl.
*B60R 21/18* (2006.01)
*B60R 21/00* (2006.01)

(52) U.S. Cl.
CPC ...... *B60R 21/18* (2013.01); *B60R 2021/0004* (2013.01)

(58) Field of Classification Search
CPC ...................................................... B60R 21/18
See application file for complete search history.

(56) References Cited

U.S. PATENT DOCUMENTS

| | | | | |
|---|---|---|---|---|
| 3,905,615 A * | 9/1975 | Schulman | B60R 21/18 | 280/730.1 |
| 3,948,541 A * | 4/1976 | Schulman | B60R 21/18 | 244/122 B |
| 7,926,839 B1 | 4/2011 | Mothaffar | | |
| 2015/0054264 A1* | 2/2015 | Hirako | B60R 21/18 | 280/728.3 |
| 2017/0080887 A1* | 3/2017 | Evans | B60N 2/4242 | |
| 2019/0016288 A1* | 1/2019 | Schneider | B60R 21/18 | |
| 2019/0176738 A1* | 6/2019 | Kim | B60R 22/14 | |
| 2019/0176744 A1* | 6/2019 | Yoo | B60R 21/18 | |

(Continued)

FOREIGN PATENT DOCUMENTS

| | | | |
|---|---|---|---|
| CN | 115768662 A * | 3/2023 | B60R 21/233 |
| CN | 117500701 A * | 2/2024 | B60R 21/23138 |

(Continued)

*Primary Examiner* — Nicole T Verley
(74) *Attorney, Agent, or Firm* — Dinsmore & Shohl LLP

(57) ABSTRACT

The occupant restraint device for a vehicle includes a three-point seatbelt device, a front impact airbag and a belt backing airbag. The three-point seatbelt device restrains the occupant, who is sitting on a vehicle seat, at the vehicle seat. The front impact airbag inflates and expands from a vehicle front side toward the occupant when gas is supplied from an inflator at a time of frontal collision of the vehicle. When gas is supplied to the belt backing airbag from another inflator at a time of frontal collision of the vehicle, the belt backing airbag inflates and expands so as to extend in a seat width direction between the shoulder belt of a seatbelt of the seatbelt device and the shoulder areas of the occupant. The belt backing airbag restrains both of the shoulder areas of the occupant, including clavicles of the occupant.

12 Claims, 9 Drawing Sheets

(56) References Cited

U.S. PATENT DOCUMENTS

| | | | | |
|---|---|---|---|---|
| 2019/0193672 | A1 | 6/2019 | Ohno et al. | |
| 2021/0094496 | A1* | 4/2021 | Tanaka | B60R 21/20 |
| 2021/0300278 | A1* | 9/2021 | Hayashi | B60R 21/18 |
| 2022/0063555 | A1* | 3/2022 | Kanegae | B60R 21/0136 |
| 2022/0297626 | A1* | 9/2022 | Meador | B60R 22/28 |
| 2024/0300438 | A1 | 9/2024 | Shimazu et al. | |
| 2025/0058734 | A1* | 2/2025 | Ohno | B60R 21/233 |

FOREIGN PATENT DOCUMENTS

| | | | | | |
|---|---|---|---|---|---|
| DE | 4116162 | A1 | * | 11/1992 | B60R 21/18 |
| DE | 102018123633 | A1 | * | 3/2020 | B60R 21/23 |
| JP | 5199604 | B2 | * | 5/2013 | B60R 21/207 |
| JP | 2015-217740 | A | | 12/2015 | |
| JP | 2018-034559 | A | | 3/2018 | |
| JP | 2018-047790 | A | | 3/2018 | |
| JP | 2019-116265 | A | | 7/2019 | |
| JP | 2020062923 | A | * | 4/2020 | |
| JP | 6873961 | B2 | * | 5/2021 | |
| JP | 2022-038312 | A | | 3/2022 | |
| JP | 2023042378 | A | * | 3/2023 | |
| JP | 2024-128880 | A | | 9/2024 | |
| KR | 102569645 | B1 | * | 8/2023 | B60R 21/207 |
| WO | WO-9944865 | A1 | * | 9/1999 | B60R 22/14 |
| WO | WO-2020017280 | A1 | * | 1/2020 | B60R 21/2338 |
| WO | WO-2020017282 | A1 | * | 1/2020 | B60R 21/2338 |
| WO | WO-2020064449 | A1 | * | 4/2020 | B60R 21/23 |
| WO | WO-2021220885 | A1 | * | 11/2021 | B60R 21/2338 |
| WO | WO-2022215543 | A1 | * | 10/2022 | B60R 21/23138 |

* cited by examiner

OCCUPANT RESTRAINT DEVICE FOR VEHICLE

CROSS-REFERENCE TO RELATED APPLICATION

This application is based on and claims priority under 35 USC 119 from Japanese Patent Application No. 2024-034378 filed on Mar. 6, 2024, the disclosure of which is incorporated by reference herein.

BACKGROUND

Technical Field

The present disclosure relates to an occupant restraint device for a vehicle.

Related Art

An occupant restraint device for a vehicle has been known since heretofore, such as, for example, a technology disclosed in Japanese Patent Application Laid-Open (JP-A) No. 2015-217740, in which a shoulder belt is provided with an auxiliary airbag device that causes an auxiliary bag body to inflate and expand to a vehicle front side of a shoulder area at a side (a vehicle width direction inner side) of the occupant away from the shoulder belt at a time of frontal collision of the vehicle. Thus, the shoulder area at the side away from the shoulder belt of the occupant, who is sitting on a seat, may be restrained at the seat via the auxiliary bag body, and both vehicle width direction sides of the upper body of the occupant may be firmly restrained.

A further occupant restraint device for a vehicle has been known since heretofore, such as, for example, a technology disclosed in JP-A No. 2018-047790, in which an airbag that inflates in a thickness direction of a shoulder belt at a time of frontal collision of the vehicle is provided in a range along the shoulder belt from a belt guide that is disposed at an upper portion of a seat back to a shoulder area of the occupant. Thus, the shoulder area of the occupant is restrained, the shoulder belt is separated from a chest area of the occupant, and an applied load acting on the chest area from the shoulder belt is moderated.

However, in a structure in which an airbag expands to the vehicle front side of a shoulder belt at a time of frontal collision of a vehicle, application of a localized load to the chest area of an occupant from the shoulder belt may not be moderated. Thus, deformation of the chest of the occupant may not be suppressed.

Moreover, during expansion, this airbag may interfere with a front impact airbag that inflates toward the occupant from the vehicle front side, and the airbag may not expand to a targeted position. Meanwhile, because an airbag that inflates in the thickness direction of a shoulder belt at a time of frontal collision of a vehicle is provided along the shoulder belt, restraint performance at the shoulder area at the vehicle width direction inner side of the occupant, at which the shoulder belt is not worn, is not assured. Thus, there is scope for improvement in regard to improving restraint performance.

SUMMARY

The present disclosure provides an occupant restraint device for a vehicle that, at a time of frontal collision of the vehicle, may suppress interference between a belt backing airbag and a front impact airbag, may moderate application of a localized load from a shoulder belt to a chest area of an occupant, and may assure restraint performance for both shoulder areas of the occupant.

An occupant restraint device for a vehicle according to a first aspect of the present disclosure includes: a three-point seatbelt device that restrains an occupant sitting on a vehicle seat at the vehicle seat; a front impact airbag that inflates and expands from a vehicle front side toward the occupant when gas is supplied to the front impact airbag from an inflator at a time of frontal collision of the vehicle; and a belt backing airbag that, when gas is supplied to the belt backing airbag from an inflator at a time of frontal collision of the vehicle, inflates and expands so as to extend in a seat width direction between a shoulder belt of a seatbelt of the seatbelt device and shoulder areas of the occupant, the belt backing airbag restraining both of the shoulder areas of the occupant including clavicles of the occupant.

According to the first aspect, when the gas from the inflator is supplied at a time of frontal collision of the vehicle, the belt backing airbag inflates and expands so as to extend in the seat width direction between the shoulder belt of the seatbelt of the seatbelt apparatus and the shoulder areas of the occupant, and the belt backing airbag restrains both of the shoulder areas, including clavicles, of the occupant. Thus, the shoulder belt of the seatbelt is a member that receives a reaction force of the belt backing airbag. As a result, interference of the belt backing airbag with the front impact airbag is suppressed.

Because a localized force applied to the occupant from the shoulder belt is dispersed to both of the shoulder areas via the belt backing airbag, application of a localized load to the chest area of the occupant from the shoulder belt is moderated, and restraint performance for both of the shoulder areas of the occupant is assured. A localized load applied to the chest area of the occupant from the shoulder belt is further moderated because the shoulder belt is lifted from the chest area of the occupant by the thickness of the belt backing airbag. Therefore, particularly for women and occupants with relatively low chest durability such as older people, a chest injury value due to movement to the vehicle front side being impeded by the shoulder belt is reduced.

At a time of frontal collision of the vehicle, slack in the shoulder belt at the start of the collision may be taken up by the belt backing airbag inflating and expanding. Therefore, a pre-tensioner mechanism may be omitted from the seatbelt apparatus. Note that the meaning of the term “at a time of frontal collision” of the vehicle as used herein is intended to include an estimation (prediction) that a frontal collision of the vehicle is unavoidable.

In an occupant restraint device for a vehicle according to a second aspect of the present disclosure, in the occupant restraint device for a vehicle according to the first aspect, the belt backing airbag includes an upward extension portion at least at an end portion at a side of the belt backing airbag that is disposed at the shoulder belt, the upward extension portion opposing an upper face of a shoulder area of the occupant that is at a side at which the shoulder belt is disposed.

According to the second aspect, the upper extension portion that is formed at least at the end portion at a shoulder belt side of the belt backing airbag opposes the upper face of a shoulder area of the occupant at the shoulder belt side. Therefore, compared to a structure in which the upper extension portion is not formed at the belt backing airbag, at a time of frontal collision of the vehicle, an amount of interference of the belt backing airbag with the shoulder area, including the clavicle, of the seat occupant who is moving to the vehicle front side due to inertial force is increased. Therefore, even though occupants have different physical builds, the shoulder area including the clavicle of an occupant that is the target of the belt backing airbag is likely to be braced.

In an occupant restraint device for a vehicle according to a third aspect of the present disclosure, in the occupant restraint device for a vehicle according to the first aspect or second aspect, the belt backing airbag starts restraining the occupant with the shoulder belt serving as a reaction force member and subsequently, in association with movement of the occupant toward the vehicle front side due to inertial force, the belt backing airbag continues restraining the occupant with the front impact airbag serving as a further reaction force member.

According to the third aspect, the belt backing airbag begins restraining the occupant with the shoulder belt acting as a reaction force member. Then, as the occupant moves to the vehicle front side due to inertial force, the front airbag also acts as a reaction force member and continues restraining the occupant. Therefore, restraint force is generated effectively even at the shoulder area, including the clavicle, at the side away from the shoulder belt, at which the shoulder belt is not worn, and the occupant may be restrained efficiently.

In an occupant restraint device for a vehicle according to a fourth aspect of the present disclosure, in the occupant restraint device for a vehicle according to the third aspect, the belt backing airbag is configured so as to inflate and expand to a predetermined shape earlier than the front impact airbag.

According to the fourth aspect, the belt backing airbag inflates and expands to the predetermined shape prior to the front impact airbag. Therefore, the belt backing airbag inflates and expands to the targeted shoulder areas including clavicles of the occupant without being affected by the front impact airbag.

In an occupant restraint device for a vehicle according to a fifth aspect of the present disclosure, in the occupant restraint device for a vehicle according to the third aspect or the fourth aspect, an internal pressure of the inflated and expanded belt backing airbag is higher than an internal pressure of the inflated and expanded front impact airbag.

According to the fifth aspect, the internal pressure of the inflated and expanded belt backing airbag is higher than the internal pressure of the inflated and expanded front impact airbag. Therefore, in the later stage of occupant restraint, the inflated and expanded belt backing airbag is not greatly crushed by the inflated and expanded front impact airbag, and the shoulder belt may continue to be lifted from the chest area of the occupant. Therefore, application of a localized load to the chest area of the occupant may be moderated more effectively.

In an occupant restraint device for a vehicle according to a sixth aspect of the present disclosure, in the occupant restraint device for a vehicle according to any one of the first to fifth aspects, activation of a pre-tensioner mechanism of the seatbelt device is set to be subsequent to completion of inflation and expansion of the belt backing airbag.

According to the sixth aspect, activation of the pre-tensioner mechanism of the seatbelt apparatus is after the completion of inflation and expansion of the belt backing airbag. Therefore, the belt backing airbag inflates and expands to the targeted shoulder areas including clavicles of the occupant without being affected by the pre-tensioner mechanism.

In an occupant restraint device for a vehicle according to a seventh aspect of the present disclosure, in the occupant restraint device for a vehicle according to any one of the first to fifth aspects, activation of a pre-tensioner mechanism of the seatbelt device is prohibited during inflation and expansion of the belt backing airbag.

According to the seventh aspect, activation of the pre-tensioner mechanism of the seatbelt apparatus during inflation and expansion of the belt backing airbag is prohibited. Therefore, the belt backing airbag inflates and expands to the targeted shoulder areas including clavicles of the occupant without being affected by the pre-tensioner mechanism.

As described above, according to the present disclosure, at a time of frontal collision of the vehicle, interference between the belt backing airbag and the front impact airbag may be suppressed, application of a localized load from the shoulder belt to a chest area of an occupant may be moderated, and restraint performance for both shoulder areas of the occupant may be assured.

BRIEF DESCRIPTION OF THE DRAWINGS

Exemplary embodiments of the present disclosure will be described in detail based on the following figures, wherein.

DETAILED DESCRIPTION

Figure 1:
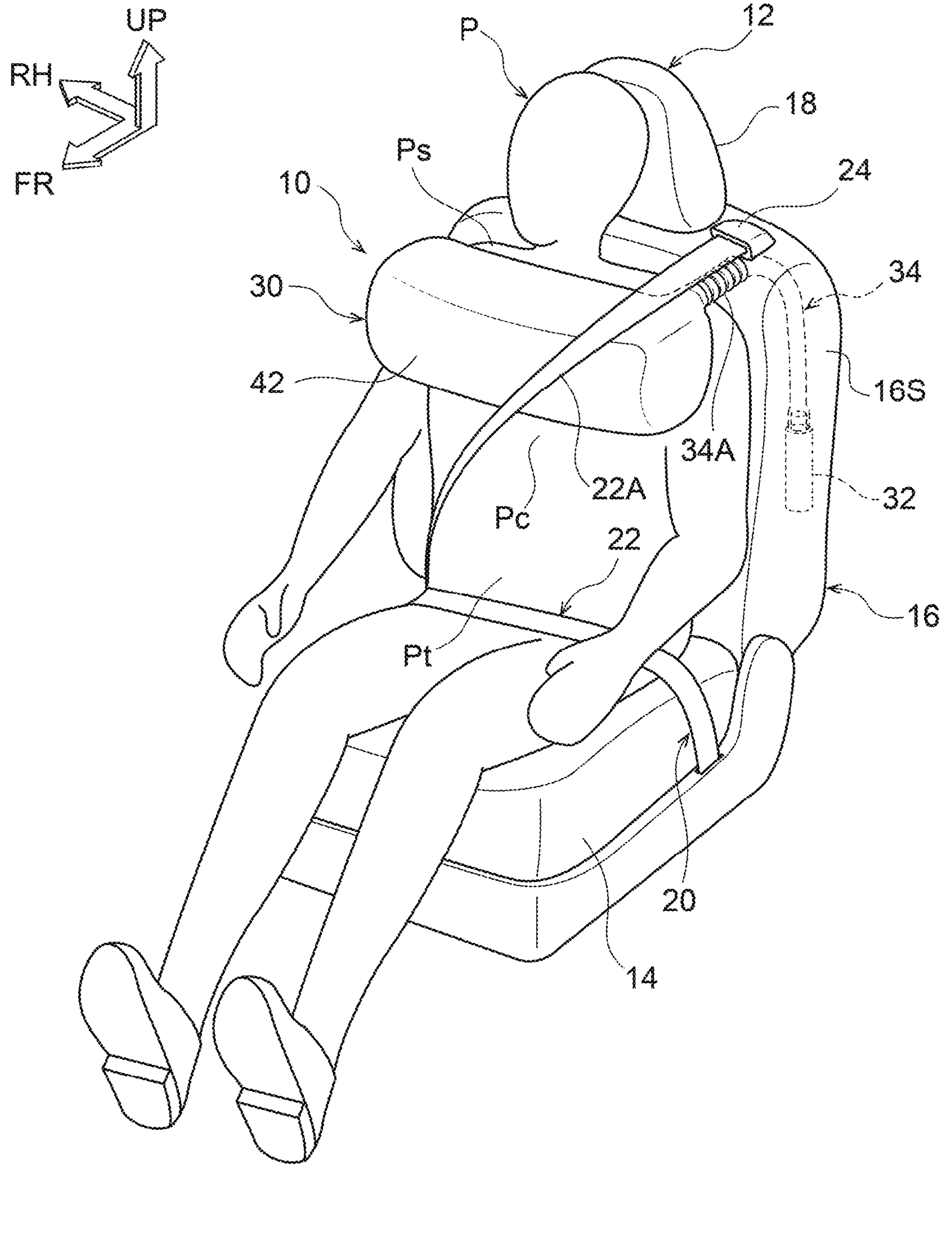
FIG. 1 is a schematic perspective view showing a state of a belt backing airbag of an occupant restraint device for a vehicle according to a first exemplary embodiment at a time of inflation and expansion.

Below, exemplary embodiments relating to the present disclosure are described in detail in accordance with the drawings. For convenience of description, the arrow UP that is shown where appropriate in the drawings indicates an upper direction of a vehicle and a vehicle seat, an arrow FR indicates a front direction of the vehicle and vehicle seat, and an arrow RH indicates a right direction of the vehicle and vehicle seat. Where the directions upper, lower, front, rear, left and right are used in the descriptions below without being particularly specified, the same represent upper, lower, front, rear, left and right of the vehicle and the vehicle seat. The left-and-right direction is equivalent to a vehicle width direction and a seat width direction.

First Exemplary Embodiment

First, a first exemplary embodiment is described. As shown in FIG. 1 to FIG. 5, an occupant restraint device for a vehicle 10 according to the first exemplary embodiment is principally provided at a vehicle seat 12. The vehicle seat 12 is a front seat or a rear seat of a vehicle (a car). In this exemplary embodiment, a front seat at a driver seat side serves as the vehicle seat 12. The vehicle seat 12 includes a seat cushion 14, a seat back 16 and a headrest 18. The seat back 16 is provided at a rear end portion of the seat cushion 14 to be turnable about an axis in the seat width direction. The headrest 18 is provided at an upper end portion of the seat back 16 to be capable of being raised and lowered.

FIG. 1 and so forth depict a state in which a crash test dummy (a human body dummy) serving as a model of a vehicle occupant (seat occupant) who should be protected is seated on the vehicle seat 12. The dummy is, for example, a frontal crash test dummy (Hybrid III), AM 50 (the 50th percentile of American adult males). The dummy is seated in a standard sitting attitude designated for impact testing, and the vehicle seat 12 is disposed at a standard specified position corresponding to the sitting attitude. Below, the dummy is referred to as "the occupant P". The occupant P includes a shoulder area Ps, a chest area Pc, and an abdomen area Pt.

As shown in FIG. 1 to FIG. 5, the occupant P sitting on the seat cushion 14 of the vehicle seat 12 is restrained at the vehicle seat 12 by a seatbelt (webbing) 22 provided at a seatbelt apparatus 20. The seatbelt apparatus 20 is a three-point seatbelt apparatus and is what is known as an integrated seatbelt apparatus. Below, a portion of the seatbelt 22 extending from a shoulder area Ps to a chest area Pc of the occupant P is referred to as a shoulder belt 22A.

A bezel 24 that is a gateway for the seatbelt 22 is provided at a vehicle width direction outer side (seat width direction one end portion side) of an upper end face of the seat back 16. A buckle 26 is provided at the vehicle width direction inner side (seat width direction other end portion side) of the seat cushion 14. The buckle 26 is attachable to a tongue 25 provided at the seatbelt 22 (see FIG. 2). A retractor 28 that takes up one end portion side of the seatbelt 22 (see FIG. 3) is provided at a lower portion of a side frame (not shown in the drawings) at the vehicle width direction outer side, which is provided inside the seat back 16. A pre-tensioner mechanism and a force limiter mechanism are provided at the retractor 28.

An airbag device 30 is provided at the vehicle seat 12. The airbag device 30 is provided with an inflator 32, a belt backing airbag 42, and a gas supply tube 34, which is described below. The inflator 32 is embedded in a side portion 16S at the vehicle width direction outer side of the seat back 16. At usual times, the belt backing airbag 42 is accommodated inside a cover member 40 (see FIG. 4 and FIG. 5) in a folded up state. The gas supply tube 34 connects the belt backing airbag 42 with the inflator 32 and supplies gas from the inflator 32 to the belt backing airbag 42.

Figure 4:
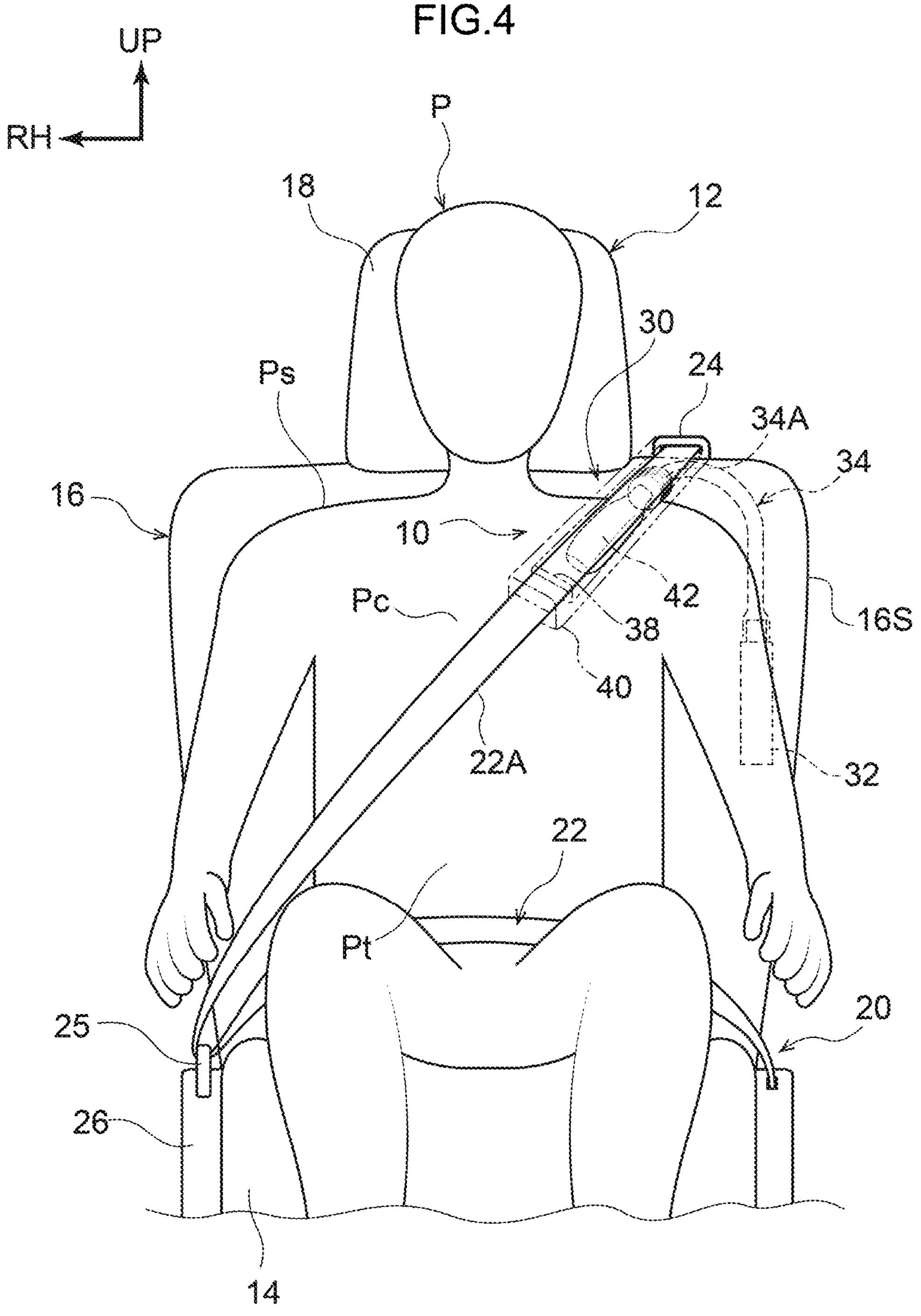
FIG. 4 is a schematic front view showing a state of the occupant restraint device for a vehicle according to the first exemplary embodiment at a usual time.
Figure 5:
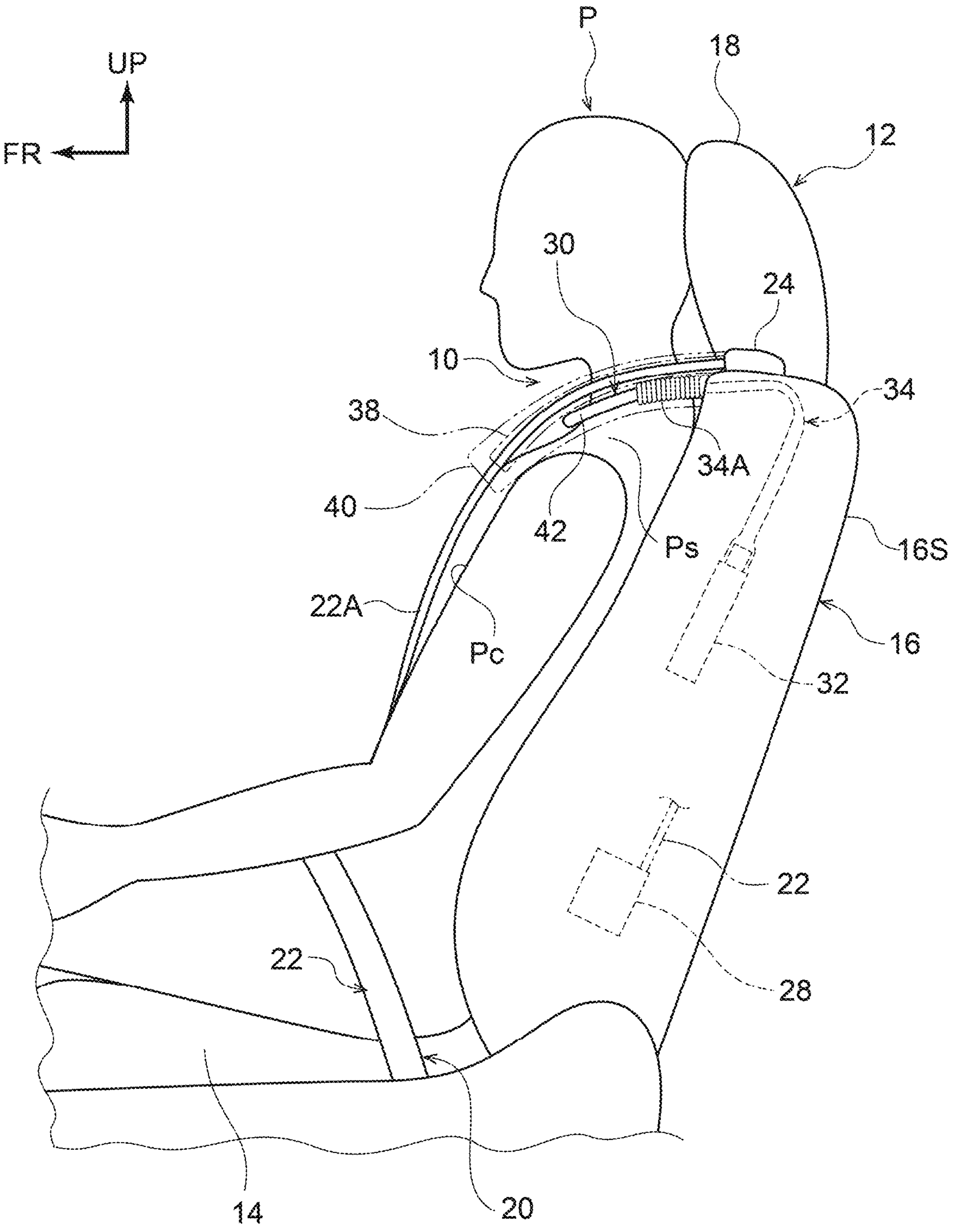
FIG. 5 is a schematic side view showing the state of the occupant restraint device for a vehicle according to the first exemplary embodiment at the usual time.

As shown in FIG. 4 and FIG. 5, the cover member 40 is attached by sewing or the like to a holder member made of cloth (not shown in the drawings), which retains a guide member 38 in which the shoulder belt 22A is movably inserted. The cover member 40 covers around this holder member, the belt backing airbag 42, an extension and contraction portion 34A of the gas supply tube 34, and the shoulder belt 22A. The belt backing airbag 42 is disposed at the side of the guide member 38 at which the occupant P is disposed. The extension and contraction portion 34A is described below. The shoulder belt 22A opposes the shoulder area Ps of the occupant P. The cover member 40 is configured such that at least the side thereof at which the occupant P is disposed ruptures in association with inflation and expansion of the belt backing airbag 42.

The guide member 38 is formed in a flattish rectangular tube shape of, for example, a silicon-based resin material with a high slidability characteristic, so as to facilitate movement (sliding) of the shoulder belt 22A. The holder member is attached by arbitrary fixing device to a periphery face of the guide member 38, excluding the side thereof at which the occupant P is disposed. With this guide member 38, a structure is formed in which the shoulder belt 22A does not touch the extension and contraction portion 34A of the gas supply tube 34. Thus, at times of wearing and removal of the seatbelt 22, no external force acts on the extension and contraction portion 34A of the gas supply tube 34.

The inflator 32 is, for example, a substantially cylindrical sealed gas-type (cold-type) cylinder inflator. The inflator 32 is activated by a control unit provided in the vehicle, which is not shown in the drawings, when a frontal collision of the vehicle is detected or a frontal collision is estimated (predicted) to be unavoidable (below, "at a time of frontal collision of the vehicle") by a collision sensor, which is not shown in the drawings, and which may be a camera and the like. When activated, the inflator 32 produces the gas.

That is, the control unit is electronically connected to the inflator 32 and the collision sensor. At a time of frontal collision of the vehicle, the control device activates the inflator 32 on the basis of information from the collision sensor. Modes of frontal collision of the vehicle in which the control unit activates the inflator 32 include, in addition to a full-overlap frontal collision, offset frontal collisions such as an oblique collision, a small-overlap frontal collision and so forth.

The inflator 32 is attached to, for example, the side frame at the vehicle width direction outer side of the seat back 16 together with the retractor 28, with an axial direction of the inflator 32 substantially in the vertical direction. One end portion of the gas supply tube 34 is configured by, for example, a flexible tube or the like. The one end portion of the gas supply tube 34 is connected to be in fluid communication with a jetting out aperture, which is an upper end portion of the inflator 32. The other end portion of the gas supply tube 34 projects from the seat back 16 at the lower side of the bezel 24 and is connected to be in fluid communication with the belt backing airbag 42.

Figure 6:
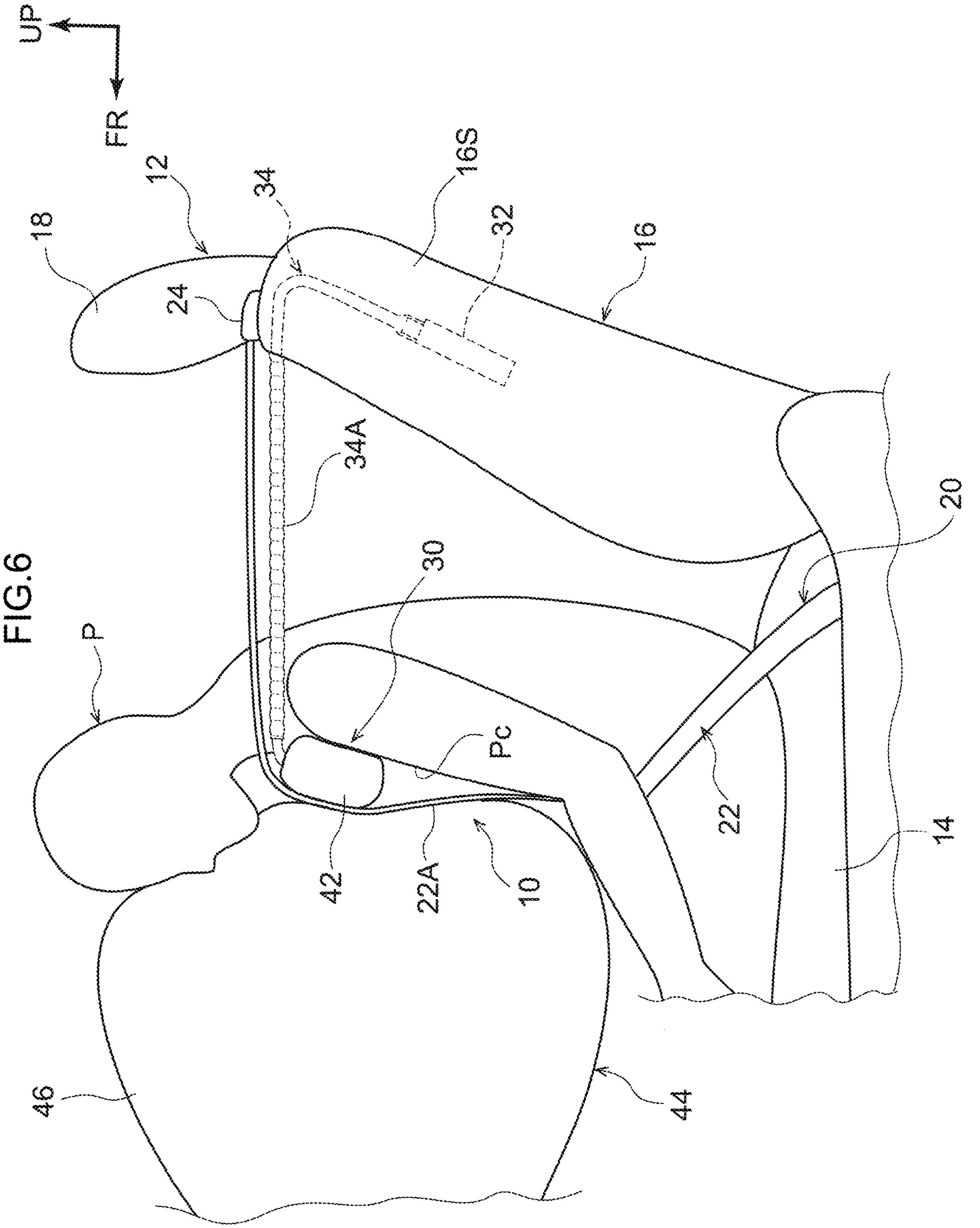
FIG. 6 is a schematic side view showing a time of occupant restraint of the occupant restraint device for a vehicle according to the first exemplary embodiment.

As shown in FIG. 6, in order to supply gas from the inflator 32 to the belt backing airbag 42, a portion of the gas supply tube 34 at the side thereof at which the belt backing airbag 42 is disposed, that is, a predetermined partial region of the gas supply tube 34 protruding from the seat back 16 serves as the extension and contraction portion 34A, which is configured to be capable of extending to follow movement of the belt backing airbag 42 to the front side.

To describe this more specifically, the extension and contraction portion 34A of the gas supply tube 34 that projects from the seat back 16 is formed in a concertina shape and is capable of extending under a predetermined tension load. Thus, when the belt backing airbag 42 is supplied with gas and inflates and expands, the extension and contraction portion 34A of the gas supply tube 34 widens to a predetermined outer diameter, enabling a fast and stable gas supply. Then, when the belt backing airbag 42 moves to the front side in association with a movement of the occupant P to the front side, the extension and contraction portion 34A of the gas supply tube 34 extends and contracts in diameter to a predetermined internal diameter.

Because of the extension and contraction portion 34A contracting in diameter, the gas supply tube 34 fulfills the role of a check valve and gas is unlikely to flow back from the interior of the belt backing airbag 42. The extension and contraction portion 34A of the gas supply tube 34 is configured so as to extend under a lower load than a force limiter load of the force limiter mechanism provided at the retractor 28.

As shown in FIG. 4 and FIG. 5, when the extension and contraction portion 34A of the gas supply tube 34 is accommodated inside the cover member 40, the concertina-shaped portion is in a contracted state. However, the extension and contraction portion 34A may be in a shape that is squashed along the shoulder belt 22A. That is, the extension and contraction portion 34A of the gas supply tube 34 in a squashed shape and the folded up belt backing airbag 42 may both be accommodated inside the cover member 40.

Figure 2:
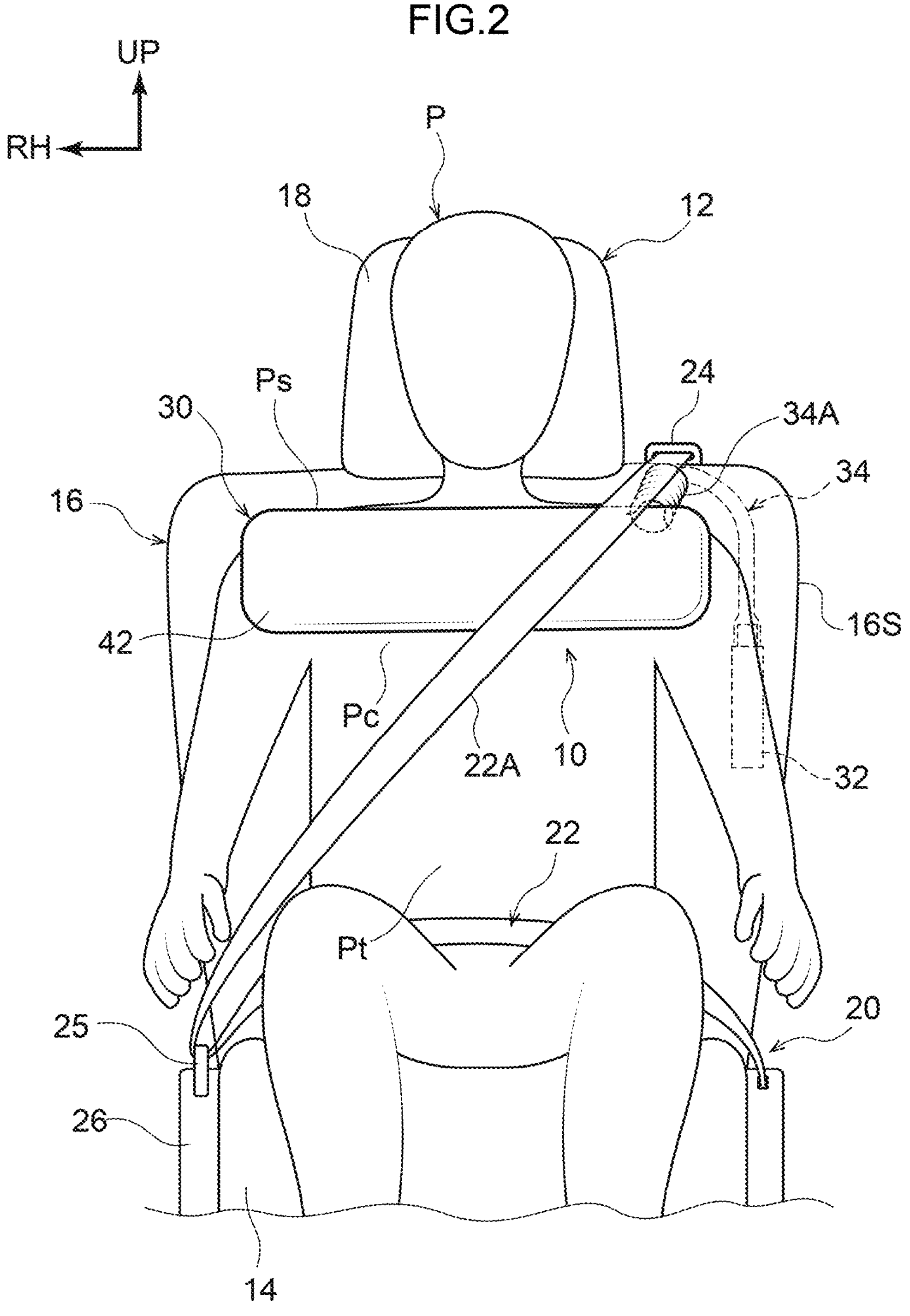
FIG. 2 is a schematic front view showing the state of the belt backing airbag of the occupant restraint device for a vehicle according to the first exemplary embodiment at the time of inflation and expansion.
Figure 3:
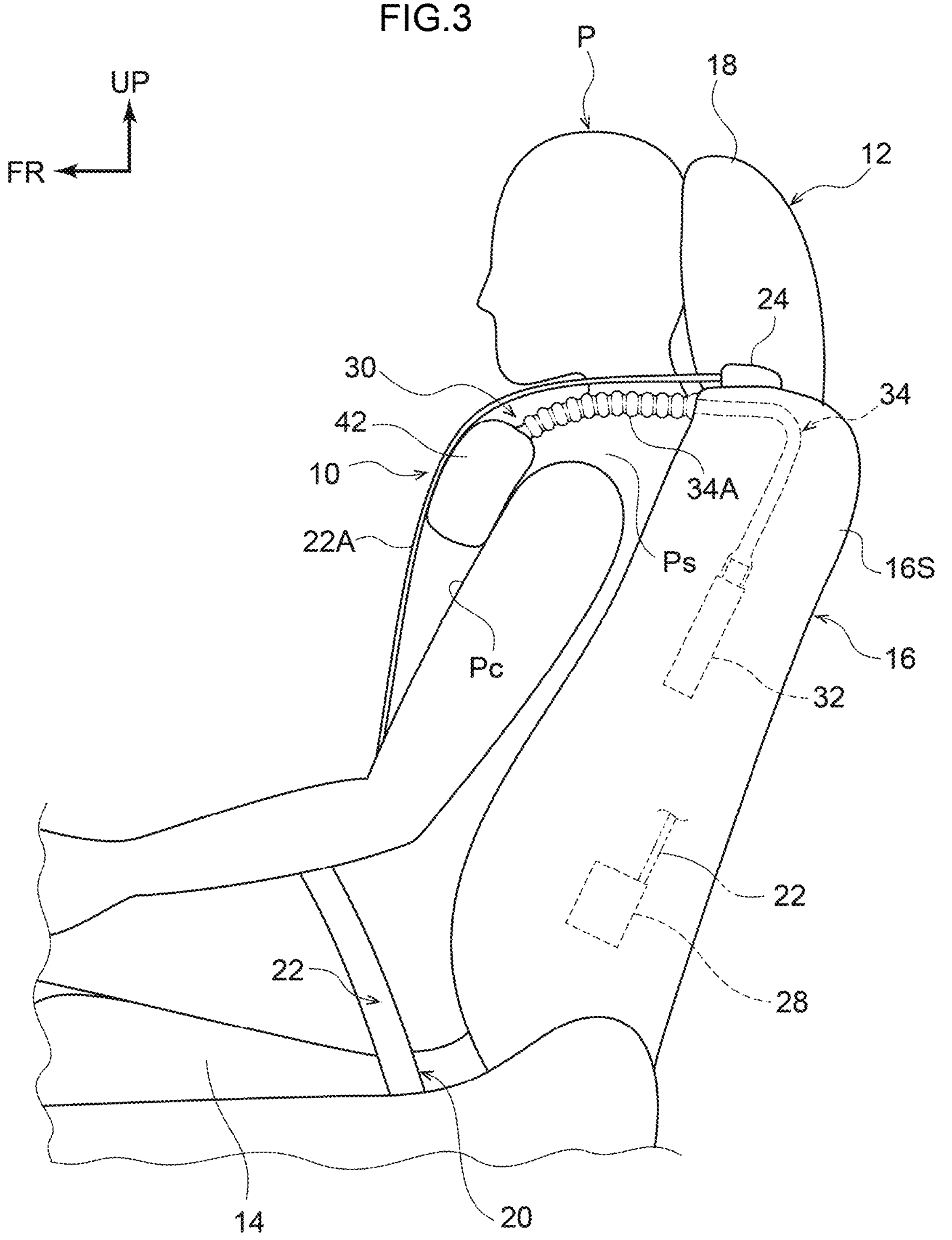
FIG. 3 is a schematic side view showing the state of the belt backing airbag of the occupant restraint device for a vehicle according to the first exemplary embodiment at the time of inflation and expansion.

The belt backing airbag 42 is formed in a bag shape by two front and rear base cloths being superposed and peripheral edge portions thereof being sewn to one another. The two base cloths have substantially rectangular shapes in elevation view with longer directions in the seat width direction. Thus, as shown in FIG. 1 to FIG. 3, the belt backing airbag 42 after the completion of inflation and expansion is configured as a single chamber with a substantially circular tube shape whose length direction (axial direction) is in the seat width direction. The length of the belt backing airbag 42 in the axial direction is set to a length capable of opposing both shoulder areas Ps of the occupant P in the front-and-rear direction. The base cloths are composed of, for example, a polyamide- or polyester-based fabric.

In this structure, the gas from the inflator is supplied to the belt backing airbag 42 via the gas supply tube 34 that passes through the lower side of the bezel 24. Therefore, the belt backing airbag 42 inflates and expands so as to extend only in the seat width direction at least between the shoulder belt 22A and both of the shoulder areas Ps of the occupant P. The belt backing airbag 42 moves to follow to the front side in a shape that is pressed by the occupant P moving to the front side due to inertial force, and the belt backing airbag 42 may restrain both of the shoulder areas Ps of the occupant P including at least the clavicles.

Figure 7:
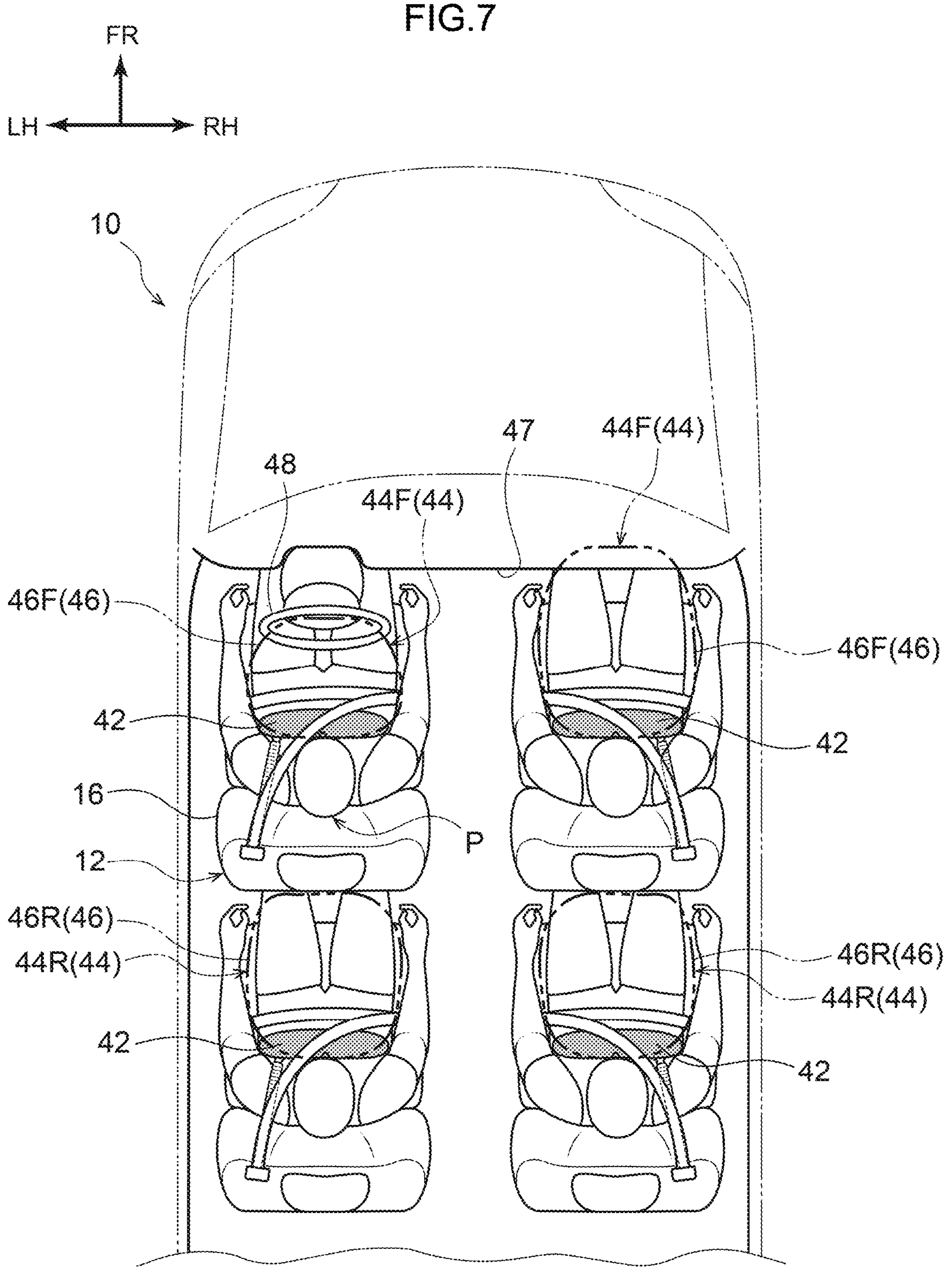
FIG. 7 is a schematic plan view showing a loaded state of a vehicle according to the occupant restraint device for a vehicle according to the first exemplary embodiment.

As shown in FIG. 7, at the front seat side, front impact airbag devices 44F (44) are embedded at the rear side of a steering wheel 48 of the vehicle and an instrument panel 47 at the front passenger seat side. At the rear seat side, front impact airbag devices 44R (44) are embedded at the rear side of the seat backs 16 of the front seats. The front impact airbag devices 44 are provided with inflators (not shown in the drawings) and front impact airbags 46F and 46R (46). The inflators are disposed at a central portion of the steering wheel 48, the rear side of the instrument panel 47 and the rear sides of the seat backs 16. At usual times, the front impact airbags 46 are accommodated in folded states in the central portion of the steering wheel 48, the rear side of the instrument panel 47 and the rear sides of the seat backs 16.

Each inflator is, for example, a substantially cylindrical sealed gas-type (cold-type) cylinder inflator similar to the inflator 32. The each inflator is activated by the control unit provided in the vehicle at a time of frontal collision of the vehicle and produces gas. That is, the control unit is electronically connected to the inflator. At a time of frontal collision of the vehicle, on the basis of information from the collision sensor, the control unit activates the inflator at, for example, a timing that is delayed by a predetermined duration relative to the inflator 32. Thus, the belt backing airbag 42 is configured so as to inflate and expand to the predetermined shape thereof earlier than the front impact airbag 46F or 46R (46).

Each front impact airbag 46 is a publicly known airbag that, when supplied with gas from the inflator, is configured to inflate and expand from the front side to the side thereof at which the occupant P is disposed, as illustrated in FIG. 6 and FIG. 7. Therefore, the front impact airbag 46 may restrain and protect the occupant P who is moving to the front side due to inertial force. The front impact airbag 46 is also formed in a bag shape by two base cloths composed of, for example, a polyamide- or polyester-based fabric being superposed and peripheral edge portions thereof being sewn to one another.

The belt backing airbag 42 starts restraining the occupant P with the shoulder belt 22A acting as a reaction force member. Subsequently, in association with movement of the occupant P to the front side due to inertial force, the belt backing airbag 42 continues to restrain the occupant P with the front impact airbag 46 acting as a further reaction force member. Accordingly, as described above, the front impact airbag 46 is configured so as to inflate and expand at the timing that is delayed by the predetermined duration relative to the belt backing airbag 42. That is, the belt backing airbag 42 is configured so as to inflate and expand to the predetermined shape thereof earlier than the front impact airbag 46.

An output power of the inflator 32 of the belt backing airbag 42 and an output power of the inflator of the front impact airbag 46 are respectively specified such that an internal pressure of the inflated and expanded belt backing airbag 42 is greater than an internal pressure of the inflated and expanded front impact airbag 46. According to control by the control unit, activation of the pre-tensioner mechanism provided at the retractor 28 is set to be subsequent to completion of inflation and expansion of the belt backing airbag 42. In other words, activation of the pre-tensioner mechanism during inflation and expansion of the belt backing airbag 42 is prohibited.

The following operations are described for the occupant restraint device for a vehicle 10 according to the first exemplary embodiment with the structure described above. Note that the guide member 38 and the cover member 40 are not shown in the drawings of FIG. 1 to FIG. 3.

At a time of frontal collision of the vehicle, the inflator 32 is activated by control from the control unit. Thus, gas is jetted out from the inflator 32. The gas jetted out from the inflator 32 is supplied through the gas supply tube 34 into the belt backing airbag 42. That is, the gas is supplied to the interior of the belt backing airbag 42 that is accommodated inside the cover member 40 in the folded up state and disposed at the side of the shoulder belt 22A at which the occupant P is disposed (the rear face side).

Accordingly, as shown in FIG. 1 to FIG. 3, the belt backing airbag 42 inflates and expands so as to extend only in the seat width direction, between the shoulder belt 22A and the shoulder areas Ps of the occupant P. Therefore, the inflated and expanded belt backing airbag 42 is disposed between the shoulder belt 22A and at least both of the shoulder areas Ps of the occupant P including clavicles of the occupant, that is, at the rear side of the shoulder belt 22A and at the front side of both of the shoulder areas Ps of the occupant P.

As shown in FIG. 6, at a time of frontal collision of the vehicle, the belt backing airbag 42 moves to the front side to follow the occupant P who is moving to the front side due to inertial force in association with the collision, and the belt backing airbag 42 restrains at least both of the shoulder areas Ps including clavicles of the occupant P. That is, the shoulder belt 22A is a member that receives reaction force from the belt backing airbag 42. As a result, interference of the belt backing airbag 42 with the front impact airbag 46 may be suppressed or prevented.

Then, the upper body of the occupant P who is moving to the front side due to inertial force, including the head area, is restrained and protected by the front impact airbag 46. In this exemplary embodiment, the front impact airbag 46 inflates and expands at a timing that is delayed by a predetermined duration relative to the belt backing airbag 42. That is, the belt backing airbag 42 inflates and expands to the predetermined shape thereof earlier than the front impact airbag 46. Therefore, the belt backing airbag 42 may be inflated and expanded to the target positions thereof, that is, the shoulder areas Ps of the occupant P including clavicles of the occupant, without being affected by the front impact airbag 46.

At this time, the extension and contraction portion 34A of the gas supply tube 34 for supplying the gas from the inflator 32 to the belt backing airbag 42 extends to follow the movement of the belt backing airbag 42 to the front side. Therefore, regardless of physical build of the occupant P, the belt backing airbag 42 may continue to be retained between the shoulder belt 22A and both of the shoulder areas Ps of the occupant P, and at least both of the shoulder areas Ps of the occupant P may be restrained effectively from an earlier stage to a later stage of the occupant restraint.

According to this belt backing airbag 42, an appropriate restraint force on the shoulder area Ps at the side away from the shoulder belt (the vehicle width direction inner side), at which the shoulder belt 22A is not worn, may be produced at an early stage. Thus, a localized load applied from the shoulder belt 22A to the occupant P may be dispersed to both of the shoulder areas Ps via the belt backing airbag 42 (and principally braced by the clavicles) at an early stage. Therefore, even with a simple structure, application of a localized load to the chest area Pc of the occupant P from the shoulder belt 22A may be moderated, and both of the shoulder areas Ps of the occupant P may be restrained efficiently.

In addition, after the belt backing airbag 42 starts restraining the occupant P with the shoulder belt 22A acting as a reaction force member, in association with the movement of the occupant P to the front side due to inertial force, the belt backing airbag 42 continues to restrain the occupant P with the front impact airbag 46 acting as a further reaction force member. Therefore, compared to a structure in which the front impact airbag 46 does not act as a reaction force member, restraint force may be produced more effectively at the shoulder area Ps at the side away from a shoulder belt, at which the shoulder belt 22A is not worn, and the upper body of the occupant P may be restrained more efficiently and with better and more stable balance between left and right.

The shoulder belt 22A may be lifted from the chest area Pc of the occupant P by the thickness of the inflated and expanded belt backing airbag 42, forming a predetermined gap between the shoulder belt 22A and the chest area Pc of the occupant P. Therefore, a localized load acting from the shoulder belt 22A on the chest area PC of the occupant P may be moderated. Therefore, particularly for women and occupants with relatively low chest durability such as older people, a chest injury value due to movement to the vehicle front side being impeded by the shoulder belt 22A may be reduced.

The internal pressure of the inflated and expanded belt backing airbag 42 is higher than the internal pressure of the inflated and expanded front impact airbag 46. Therefore, in the later stage of occupant restraint, the inflated and expanded belt backing airbag 42 is not greatly crushed by the inflated and expanded front impact airbag 46, and the shoulder belt 22A may continue to be lifted from the chest area Pc of the occupant P. Therefore, application of a localized load to the chest area Pc of the occupant P may be moderated more effectively.

Activation of the pre-tensioner mechanism of the seatbelt apparatus 20 is after the completion of inflation and expansion of the belt backing airbag 42. In other words, activation of the pre-tensioner mechanism of the seatbelt apparatus 20 during inflation and expansion of the belt backing airbag 42 is prohibited. Therefore, the belt backing airbag 42 may be inflated and expanded to the targeted shoulder areas Ps including clavicles of the occupant P without being affected by the pre-tensioner mechanism.

Thus, according to the occupant restraint device for a vehicle 10 according to the first exemplary embodiment, restraint performance of the occupant P may be improved, and occupant restraint may be implemented more efficiently. According to this occupant restraint device for a vehicle 10, at a time of frontal collision of the vehicle, slack in the shoulder belt 22A at the start of the collision may be taken up by the belt backing airbag 42 inflating and expanding. Therefore, the pre-tensioner mechanism need not be provided at the retractor 28 of the seatbelt apparatus 20. That is, the pre-tensioner mechanism may be omitted.

The belt backing airbag 42 is disposed in the folded up state at the side of the shoulder belt 22A at which the occupant is disposed (the rear face side). The inflator 32 that supplies gas to the belt backing airbag 42 and the seatbelt 22 are provided at the vehicle seat 12. That is, components structuring the occupant restraint device for a vehicle 10 are provided at the vehicle seat 12 except for the front impact airbag 46 and the inflator. Therefore, installing the vehicle seat 12 is broadly sufficient for equipping a vehicle with the occupant restraint device for a vehicle 10. Thus, equipping the occupant restraint device for a vehicle 10 may be simple. As illustrated in FIG. 7, in addition to the vehicle seat 12 at the driver seat side, a front seat at the passenger seat side, and rear seats of a minivan, an SUV or the like that are configured to be slidable far in the front-and-rear direction may also be equipped with the occupant restraint device for a vehicle 10.

Second Exemplary Embodiment

Now, a second exemplary embodiment is described. Portions that are the same as in the first exemplary embodiment are assigned the same reference symbols and detailed descriptions thereof (including operations that are the same) are omitted as appropriate.

Figure 8:
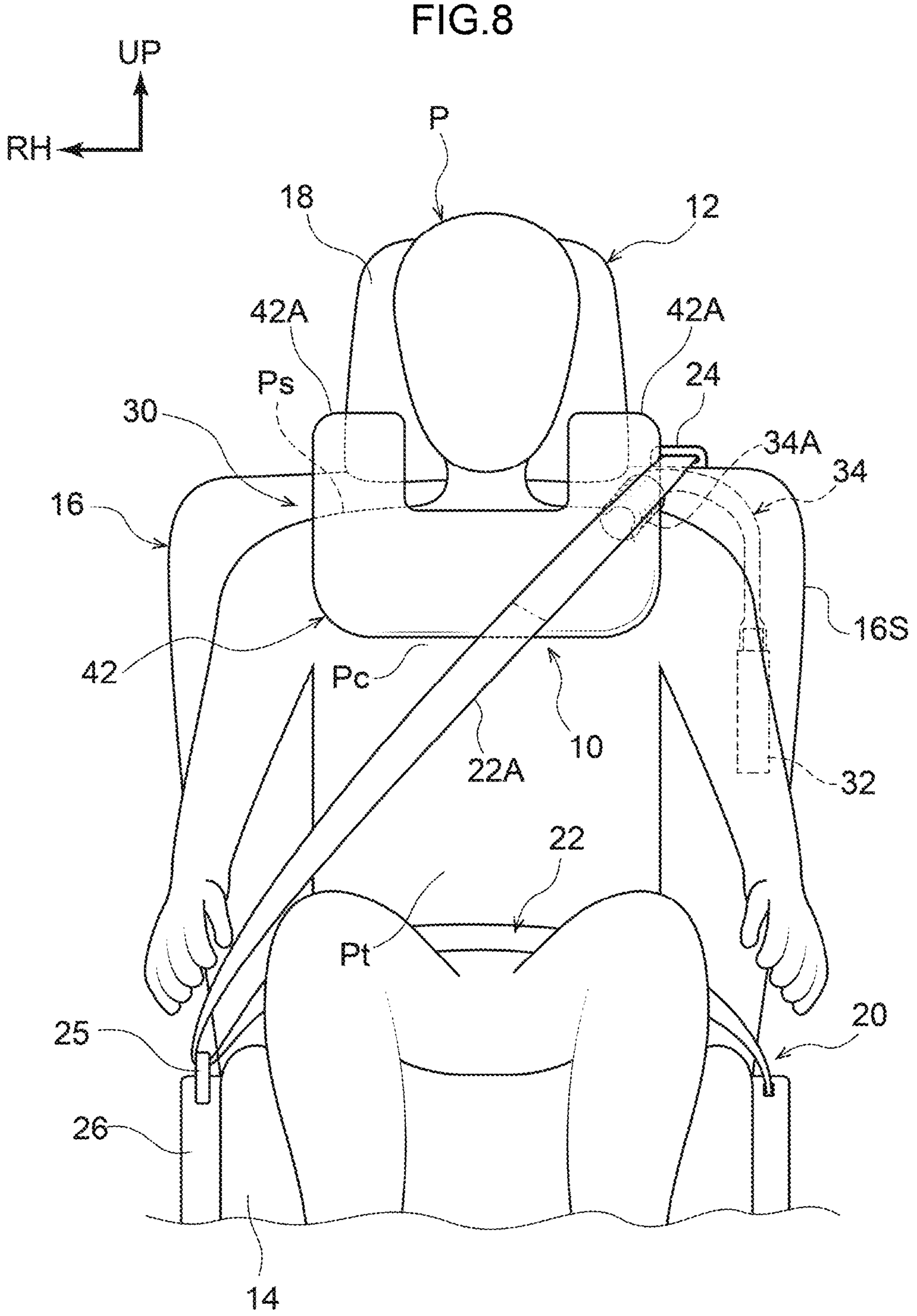
FIG. 8 is a schematic front view showing a state of a belt backing airbag of an occupant restraint device for a vehicle according to a second exemplary embodiment at a time of inflation and expansion.
Figure 9:
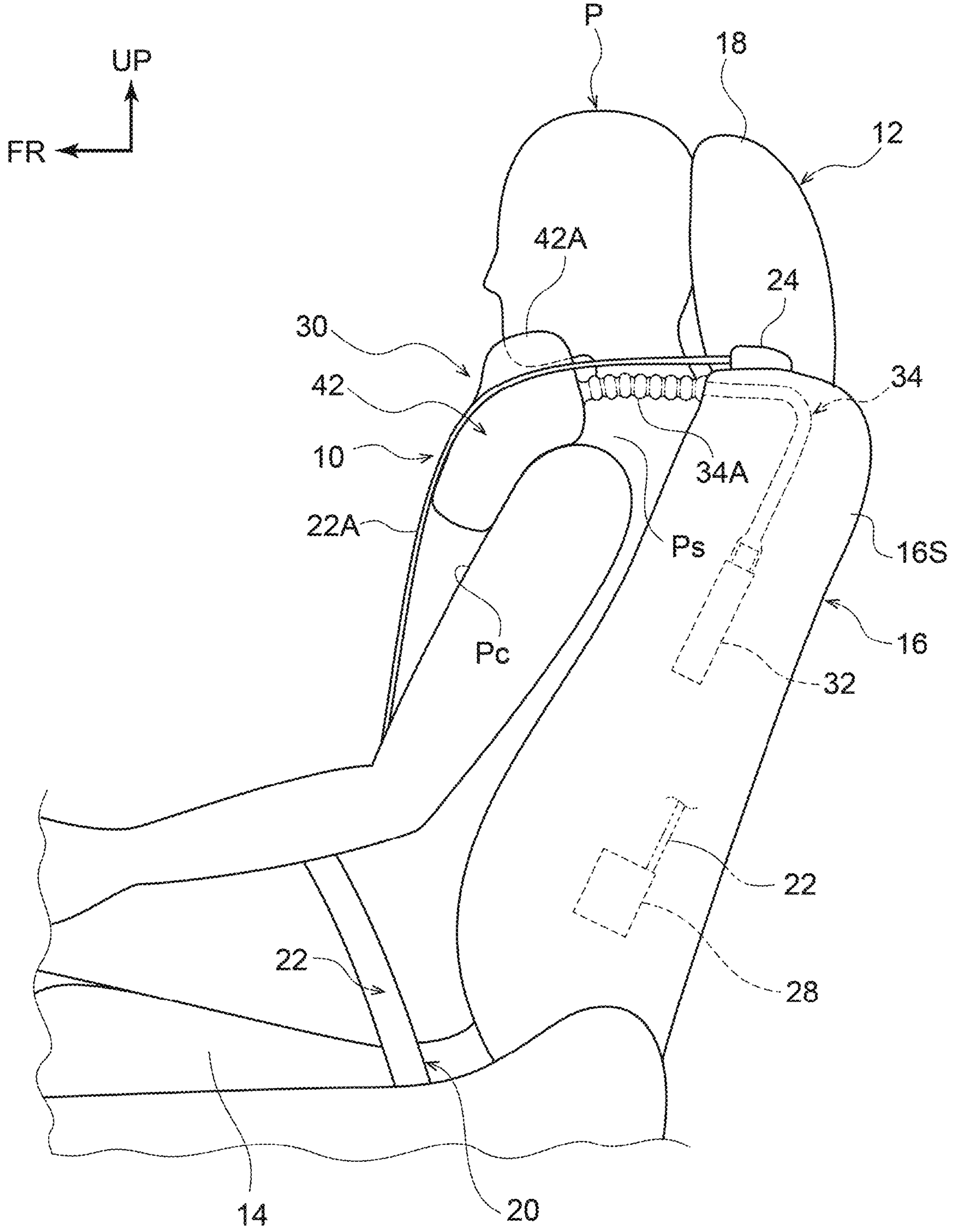
FIG. 9 is a schematic side view showing the state of the belt backing airbag of the occupant restraint device for a vehicle according to the second exemplary embodiment at the time of inflation and expansion.

As shown in FIG. 8 and FIG. 9, the occupant restraint device for a vehicle 10 according to the second exemplary embodiment differs from the first exemplary embodiment described above only in that upward extension portions 42A are formed at both seat width direction end portions (both left and right sides) of the inflated and expanded belt backing airbag 42. The upward extension portions 42A oppose upper faces of both of the shoulder areas Ps of the occupant P.

Accordingly, compared to a structure in which the upward extension portions 42A are not provided at the belt backing airbag 42, an amount of interference (a contact area) of the belt backing airbag 42 with the shoulder areas Ps including clavicles of the occupant P who is moving to the front due to inertial force at a time of frontal collision of the vehicle may be increased. Therefore, regardless of a difference in physical build of the occupant P, the shoulder areas Ps including clavicles of the occupant P that are the target of the belt backing airbag 42 are likely to be braced.

The upward extension portions 42A may just be formed at least at the end portion at the vehicle width direction outer side, that is, only at the end portion at a side at which the shoulder belt 22A is disposed. However, when the upward extension portions 42A are formed at both the left and right sides of the belt backing airbag 42, that is, at both the end portion of the belt backing airbag 42 at the side at which the shoulder belt 22A is disposed and the end portion of the belt backing airbag 42 at the side away from the shoulder belt, the belt backing airbag 42 may also be equipped to, for example, the passenger side front seat without a change in design, which is desirable in terms of fabrication costs.

Hereinabove, the occupant restraint device for a vehicle 10 according to the present exemplary embodiments is described by reference to the drawings. However, the occupant restraint device for a vehicle 10 according to the present exemplary embodiments is not limited to the structures shown in the drawings; suitable design modifications may be applied within a scope not departing from the gist of the present disclosure. For example, the other end portion of the gas supply tube 34 may be a structure that projects through the bezel 24.

The belt backing airbag 42 and the front impact airbag 46 may be inflated and expanded substantially simultaneously provided the belt backing airbag 42 may be inflated and expanded to the targeted shoulder areas Ps including clavicles of the occupant P without being affected by the front impact airbag 46. Moreover, the internal pressure of the belt backing airbag 42 may be equal to the internal pressure of the front impact airbag 46 provided the inflated and expanded belt backing airbag 42 is not crushed by the inflated and expanded front impact airbag 46 in a later stage of occupant restraint.

Because the seatbelt apparatus 20 is installed at the vehicle seat 12, the shoulder belt 22A does not necessarily need to be worn on the shoulder area at the vehicle width direction outer side. That is, the occupant restraint device for a vehicle 10 according to the present exemplary embodiments may be applied to a structure in which the shoulder belt 22A is worn on the shoulder area at the vehicle width direction inner side. Furthermore, the belt backing airbag 42 is not limited to a structure in which two base cloths are superposed and the peripheral edge portions are sewn together. The belt backing airbag 42 may have a structure in which three or more base cloths are used and peripheral edge portions thereof are sewn together. Furthermore, the material of the guide member 38 is not limited to a silicon-based resin material with a high slidability characteristic. An alternative material may be employed provided the material has slidability.

What is claimed is:

1. An occupant restraint device for a vehicle, comprising:

a three-point seatbelt device configured to restrain an occupant sitting on a vehicle seat at the vehicle seat;

a front impact airbag that inflates and expands from a vehicle front side toward the occupant when gas is supplied to the front impact airbag from an inflator at a time of frontal collision of the vehicle;

a belt backing airbag that, when gas is supplied to the belt backing airbag from an inflator at a time of frontal collision of the vehicle, inflates and expands so as to extend in a seat width direction between a shoulder belt of a seatbelt of the seatbelt device and shoulder areas of the occupant, the belt backing airbag configured to restrain both of the shoulder areas of the occupant including clavicles of the occupant, an internal pressure of the inflated and expanded belt backing airbag is higher than an internal pressure of the inflated and expanded front impact airbag;

a gas supply tube connecting the belt backing airbag with the inflator to supply gas from the inflator to the belt backing airbag, wherein the gas supply tube extends with movement of the belt backing airbag toward a front side of the vehicle.

2. The occupant restraint device for a vehicle according to claim 1, wherein the belt backing airbag includes an upward extension portion at least at an end portion at a side of the belt backing airbag that is disposed at the shoulder belt, the upward extension portion opposing an upper face of a shoulder area of the occupant that is at a side at which the shoulder belt is disposed.

3. The occupant restraint device for a vehicle according to claim 1, wherein the belt backing airbag is configured to start restraining the occupant with the shoulder belt serving as a reaction force member and subsequently, in association with movement of the occupant toward the vehicle front side due to inertial force, the belt backing airbag is configured to continue restraining the occupant with the front impact airbag serving as a further reaction force member.

4. The occupant restraint device for a vehicle according to claim 3, wherein the belt backing airbag is configured so as to inflate and expand to a predetermined shape earlier than the front impact airbag.

5. The occupant restraint device for a vehicle according to claim 1, wherein activation of a pre-tensioner mechanism of the seatbelt device is set to be subsequent to completion of inflation and expansion of the belt backing airbag.

6. The occupant restraint device for a vehicle according to claim 1, wherein activation of a pre-tensioner mechanism of the seatbelt device is prohibited during inflation and expansion of the belt backing airbag.

7. The occupant restraint device for a vehicle according to claim 2, wherein the belt backing airbag further includes an upward extension portion at an end portion at a side away from the shoulder belt, the upward extension portion opposing an upper face of a shoulder area of the occupant that is at the side away from the shoulder belt.

8. The occupant restraint device for a vehicle according to claim 2, wherein the belt backing airbag starts restraining the occupant with the shoulder belt serving as a reaction force member and subsequently, in association with movement of the occupant toward the vehicle front side due to inertial force, the belt backing airbag continues restraining the occupant with the front impact airbag serving as a further reaction force member.

9. The occupant restraint device for a vehicle according to claim 8, wherein the belt backing airbag is configured so as to inflate and expand to a predetermined shape earlier than the front impact airbag.

10. The occupant restraint device for a vehicle according to claim 2, wherein activation of a pre-tensioner mechanism of the seatbelt device is set to be subsequent to completion of inflation and expansion of the belt backing airbag.

11. The occupant restraint device for a vehicle according to claim 2, wherein activation of a pre-tensioner mechanism of the seatbelt device is prohibited during inflation and expansion of the belt backing airbag.

12. The occupant restraint device for a vehicle according to claim 1, wherein at least a portion of the gas supply tube has a concertina shape that allows the gas supply tube to extend with the movement of the belt backing airbag and contract in diameter.

* * * * *